US012607270B2

(12) United States Patent (10) Patent No.: US 12,607,270 B2
Ihns et al. (45) Date of Patent: Apr. 21, 2026

(54) SWINGING DOOR CHECK VALVE

(71) Applicant: Improved Racing Products, LLC, Orlando, FL (US)

(72) Inventors: Richard Michael Ihns, Orlando, FL (US); Casey A. Fitzgerald, Orlando, FL (US); Jarott E. Nelson, Orlando, FL (US)

(73) Assignee: Improved Racing Products, LLC, Orlando, FL (US)

( * ) Notice: Subject to any disclaimer, the term of this patent is extended or adjusted under 35 U.S.C. 154(b) by 21 days.

(21) Appl. No.: 18/910,676

(22) Filed: Oct. 9, 2024

(65) Prior Publication Data

US 2025/0122941 A1 Apr. 17, 2025

Related U.S. Application Data

(60) Provisional application No. 63/543,553, filed on Oct. 11, 2023.

(51) Int. Cl.
*F16K 15/03* (2006.01)
*F16L 29/00* (2006.01)

(52) U.S. Cl.
CPC ............. *F16K 15/033* (2013.01); *F16L 29/00* (2013.01)

(58) Field of Classification Search
CPC .............................. F16K 15/033; F16L 29/00
See application file for complete search history.

(56) References Cited

U.S. PATENT DOCUMENTS

| | | | | | |
|---|---|---|---|---|---|
| 3,144,876 | A | * | 8/1964 | Frye ........................ | F16K 15/03 417/559 |
| 2006/0266422 | A1 | * | 11/2006 | Feenstra ............. | F16K 27/0209 137/527 |
| 2013/0020520 | A1 | * | 1/2013 | Scaramucci .......... | F16K 15/033 251/298 |
| 2019/0128435 | A1 | * | 5/2019 | Fuller ................. | F16K 27/0227 |

* cited by examiner

*Primary Examiner* — P. Macade Nichols
(74) *Attorney, Agent, or Firm* — Brown Rudnick LLP; Matthew P. York

(57) ABSTRACT

The disclosure relates generally to the field of valves, and, more particularly, to a unique swinging door check valve having an improved swinging flapper door and sealing gasket design.

21 Claims, 16 Drawing Sheets

Valve body inlet

Swinging door assembly (open position)

Fluid flow (permitted)

Valve body outlet

Exemplary
check valve

Traditional hinge retains
pin using a hole machined
into the body of the valve

Traditional
sealing gasket
design

Sealing gasket

Solid-body rivet

Fixing of sealing gasket to hinge by
bucking together with solid-body rivet

Hinge
leaf

Sealing
gasket

Solid-body
rivet

Potential for leaks at junction between solid-
body rivet, sealing gasket, and hinge leaf Valve body
(inlet)

Swinging
Door Check
Valve

Valve body
(oulet)

One-way flow

Valve body
(inlet)

Valve body
(outlet)

A/B

A/B

Swinging door assembly
(open position)

Swinging door assembly
(closed position)

Valve body (outlet)

Hinge spring

Hinge pin

Valve body (inlet)

O-ring seal

Hinge spring leg retaining aperture

Hinge knuckle clip

Valve sealing gasket and hinge assembly

Hinge knuckle clip

FIG. 8A          FIG. 8B

Hinge knuckle clip

Retaining slot

Protrusions for engaging respective indentations of hinge knuckle clip

Valve body (inlet)

Hinge
knuckle clip

Retaining
slot

Sealing gasket

Rubber seal

Metal core

Flow holes (in metal core)

Integrated rivet pin

Rubber seal

Flow holes (in metal core)

Metal core

Integrated rivet pin (showing stem)

Coupling of the sealing gasket and hinge

Hinge

Sealing gasket

Unbucked
integrated rivet pin
(of sealing gasket)

Coupling of sealing gasket and hinge

Coupling of sealing gasket and hinge

Hinge

Sealing
gasket

Integrated rivet pin
(of sealing gasket)
shown in bucked
state

Coupling of sealing gasket and hinge

SWINGING DOOR CHECK VALVE

CROSS-REFERENCE TO RELATED APPLICATIONS

This application claims priority to, and the benefit of, U.S. Provisional Application No. 63/543,553, filed Oct. 11, 2023, the content of which is incorporated by reference herein in its entirety.

TECHNICAL FIELD

The disclosure relates generally to the field of valves, and, more particularly, to a unique swinging door check valve having an improved swinging flapper door and sealing gasket design.

BACKGROUND

A check valve is a valve that normally allows a fluid, such as a liquid or a gas, to flow through it in only one direction. In particular, check valves are two-port valves, meaning they have two openings in the body, one for fluid to enter (i.e., the inlet) and the other for fluid to leave (i.e., the outlet). Accordingly, check valves are used to ensure directional flow of a fluid for a given system or application.

A swing check valve (also known as a swing valve, swinging door valve, flapper check valve, etc.), is a check valve in which a valve disc (sometimes referred to as a flapper door or valve clapper) is used to block fluid flow through the valve. The disc is provided within the fluid pathway of the valve and swings, via a hinge or trunnion, between a closed position and an open position. When in a closed position, a sealing gasket of the flapper door is pressed onto an annular abutment surface of the valve to thereby block reverse flow (i.e., flow from the outlet back towards the inlet of the valve). When in the open position, the sealing gasket of the flapper door is lifted off of the abutment surface so as to allow forward flow (i.e., flow of fluid from the inlet towards the outlet of the valve).

FIG. 1 is a perspective view illustrating a traditional design of a swing check valve, showing a flapper door assembly in an open position. FIGS. 2A and 2B illustrate views of an exemplary traditional flapper door assembly. As illustrated, the flapper door assembly generally consists of a sealing gasket (generally in the shape of a disc) that is coupled to a hinge via a separate solid-body rivet (i.e., the rivet is bucked to a hinge leaf portion of the hinge) (see FIGS. 2A and 2B). The assembly is then connected to the valve via a typical hinged connection, in which pin holes are machined directly into the body of the valve for retaining a hinge pin that secures the hinge to the valve. Accordingly, the hinged connection allows for the flapper door assembly to rotate between open and closed positions. A spring is further used to apply force upon the flapper door assembly and maintain the door in a closed position (to thereby prevent backflow through the valve). The flapper door moves to the open position upon flow of fluid from the inlet of the valve (i.e., the flow of fluid has sufficient force to overcome the force imparted by the spring feature).

This traditional swing check valve design has drawbacks. In particular, the hinged connection of the flapper door assembly to the valve body can be impractical, particularly for smaller-sized valves. For example, as previously discussed, such a design requires that pin holes are machined directly into the body of the valve to thereby retain the hinge pin. In order for the flapper door sealing gasket to seat probably against an abutment surface of the valve, the pin holes must necessarily be slightly oval or elongated (to allow for some lateral movement of the sealing gasket against the abutment surface). Accordingly, machining a smaller diameter pin hole with an elongated shape can be difficult, particularly for valves of smaller sizes and designs. Furthermore, the traditional construction of the flapper door assembly relies on a separate rivet to buck the hinge to the sealing gasket. However, such a construction technique can become less reliable as the valve design is reduced in size. In particular, as a given valve become smaller in size, the various components, including the flapper door assembly components, must also have a more compact design. As such, it becomes much more difficult to reliably connect the sealing gasket to the hinge leaf via a bucked riveting technique as each component becomes smaller in size, and may lead to difficulty in creating an airtight seal when bucking the two parts together. As such, this type of construction will likely result in leaks.

SUMMARY

The present invention recognizes the drawbacks of traditional swing check valve designs. To address such drawbacks, the present invention provides a unique swinging door check valve having an improved swinging flapper door connection and sealing gasket design.

In particular, the check valve of the present invention incorporates a unique spring clip design configured to provide the hinged connection between the flapper door assembly and valve body, thereby replacing the traditional hinged connection (which relied on machined pin holes in a body of the valve). More specifically, the spring clip includes a pair of generally opposing knuckles at an open end of the spring clip, each knuckle having a corresponding slotted pin hole (i.e., elongated hole) to receive a hinge pin for rotatably coupling a flapper door assembly thereto and in alignment with the valve inlet/outlet fluid pathway. The spring clip is configured to be received within a corresponding retaining slot/groove formed proximate to an abutment surface of the valve body (i.e., the surface upon which the sealing gasket of the flapper door assembly is seated when the door is in a closed position). In particular, the clip may be compressed and then seated within the retaining slot/groove machined into the valve body. The spring clip may generally be formed from sheet metal and can be punched and formed using a mold, thereby resulting in a very simple, reliable, and cost-effective method of manufacture. Furthermore, such a design makes it easier to provide the elongated pin holes, which can be formed via punching manufacturing techniques.

The check valve of the present invention further improves upon the construction of the flapper door assembly itself. In particular, the flapper door assembly of the present invention includes a sealing gasket with an integrated stem machined as a single piece and subsequently used for bucking the sealing gasket to the hinge. More specifically, the sealing gasket includes a metal core portion, that includes an integrated stem formed as part of the metal portion, and a gasket portion formed around the metal core portion (i.e., rubber or other deformable material for providing a seal). Accordingly, the sealing gasket is a single component, consisting of a gasket seal portion formed over a metal core which includes an integrated stem (in the form of a rivet pin) that can then be bucked to the hinge to thereby connect the sealing gasket to the hinge. By providing a single sealing gasket component, in which the solid body rivet pin is already integrated into the metal core portion of the sealing gasket, it is much easier to buck the stem to the hinge and further provides an airtight seal and prevents any leaks that would otherwise occur in the traditional manner of coupling a sealing gasket to a hinge (which requires a separate rivet). Furthermore, the improved design of the present invention allows far looser manufacturing tolerances, as the rivet stem does not need to be bucked perfectly every time.

BRIEF DESCRIPTION OF THE DRAWINGS

FIGS. 8A and 8B are perspective front and rear views and FIG. 8C is a side view of the unique hinge knuckle clip for providing a hinged connection between the flapper door assembly and at least the valve body (forming the inlet).

FIGS. 15 and 16 are perspective and side views of the sealing gasket positioned relative to the hinge, including placement of the stem of the sealing gasket through a corresponding aperture in the hinge leaf.

FIG. 17 is a cross-sectional view of the sealing gasket positioned relative to the hinge taken along line F-F of FIG. 16.

FIGS. 18 and 19 are perspective and side views of the sealing gasket coupled to the hinge, illustrating the stem in a bucked state.

FIG. 20 is a cross-sectional view of the sealing gasket coupled to the hinge taken along line G-G of FIG. 19.

DETAILED DESCRIPTION

Figure 1:
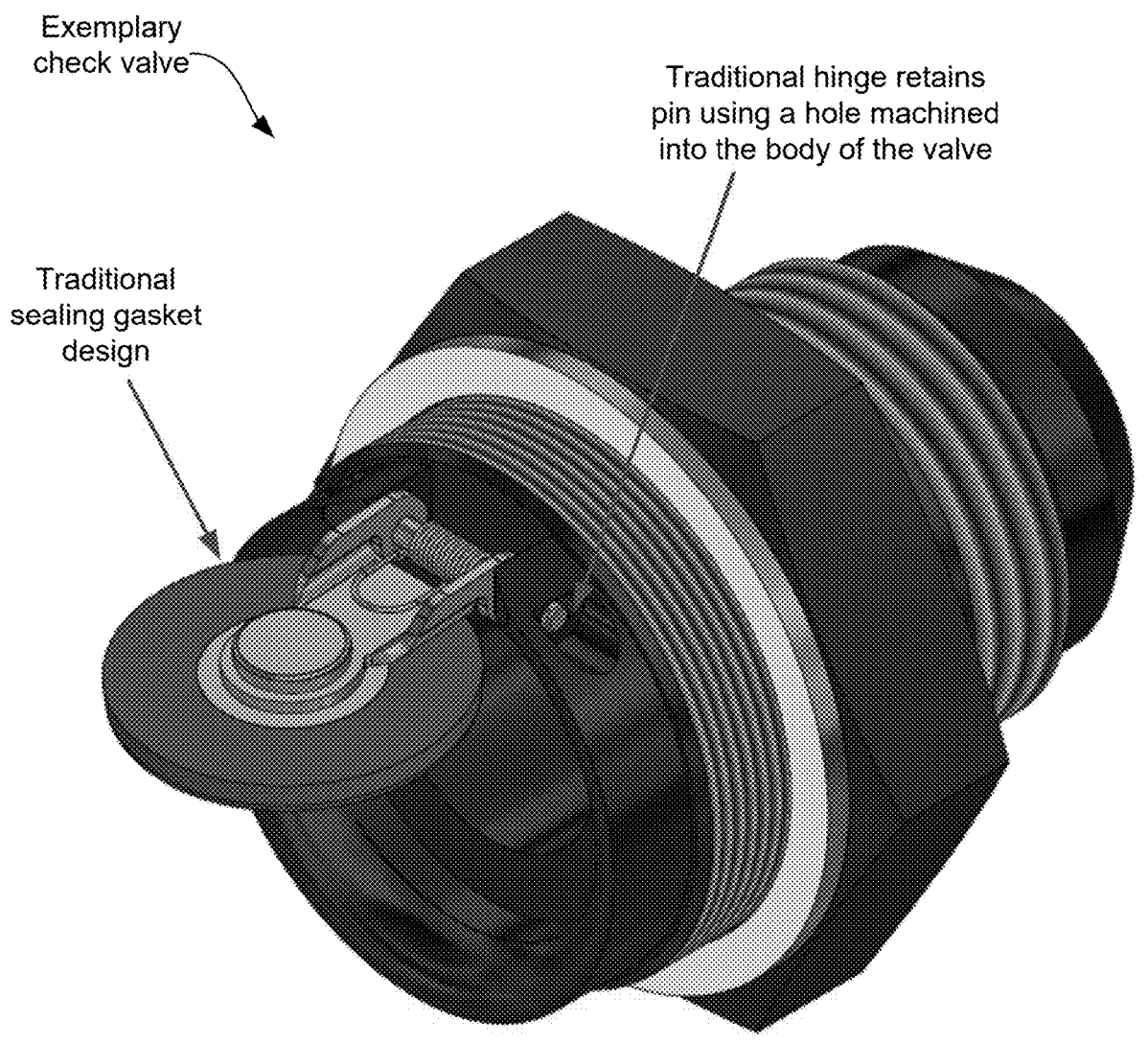
FIG. 1 is a perspective view illustrating a traditional design of a swing check valve, showing a flapper door assembly in an open position.
Figure 2A:
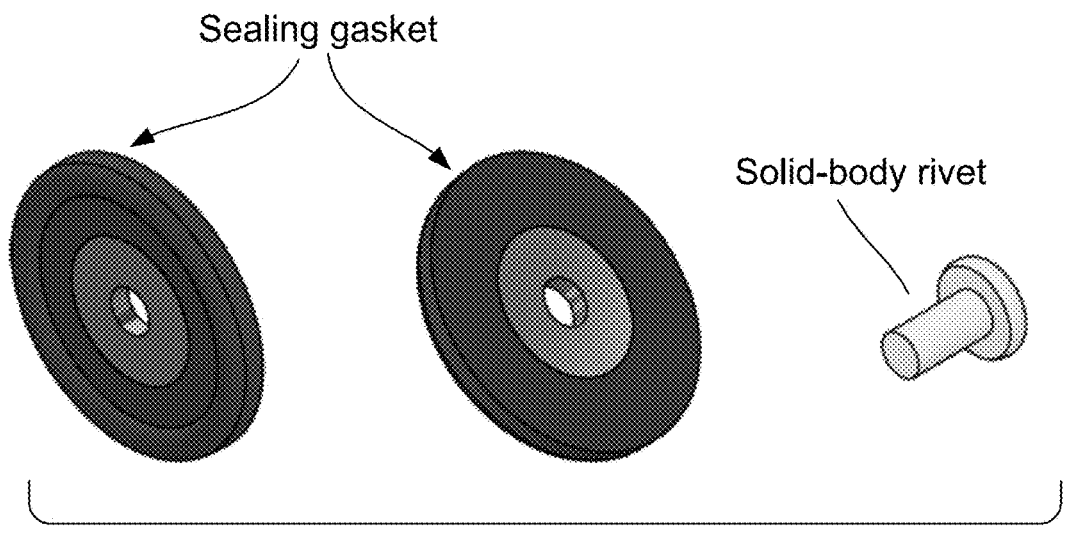
FIGS. 2A and 2B illustrate views of an exemplary traditional flapper door assembly.
Figure 2B:
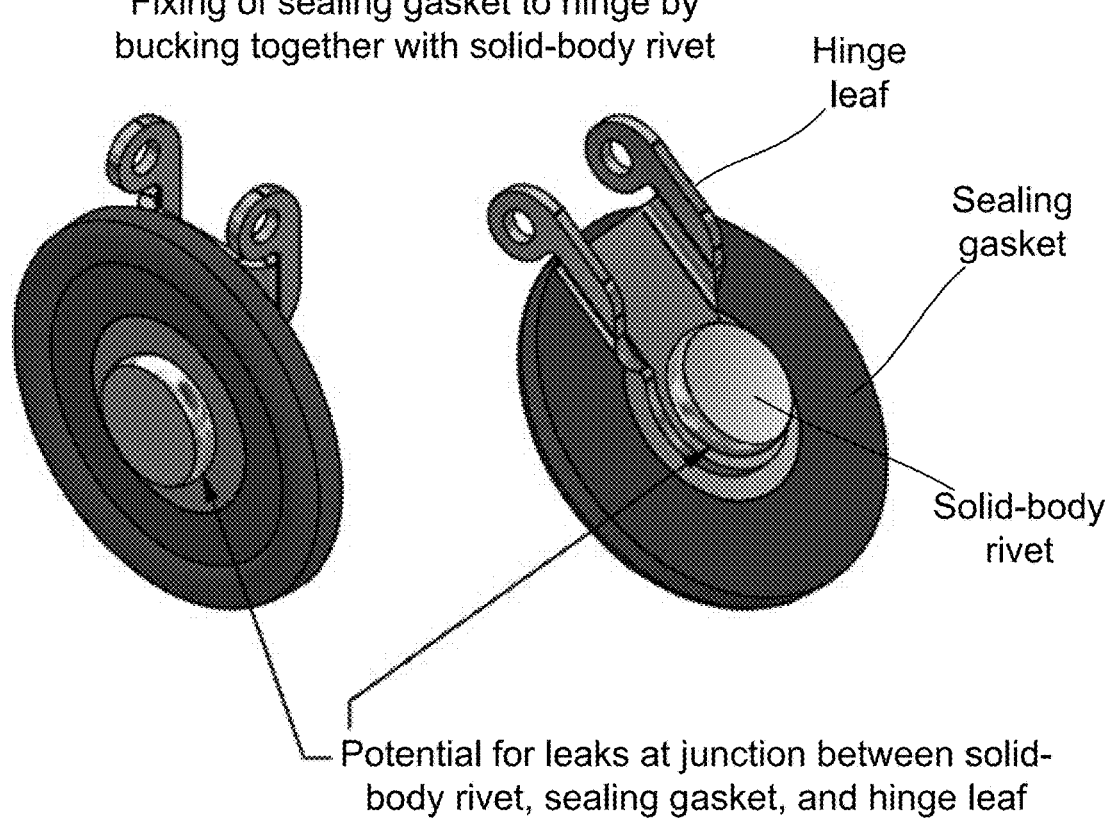

By way of overview, the present invention is directed to a check valve comprising unique and improved designs related to the sealing gasket of a swinging flapper door as well as the manner in which the swinging flapper door is rotatably connected to the valve body.

For example, in one embodiment, a check valve of the present invention incorporates a unique spring clip design configured to provide a hinged connection between the flapper door assembly and valve body, thereby replacing the traditional hinged connection (which relied on machined pin holes in a body of the valve). More specifically, the spring clip includes a pair of generally opposing knuckles at an open end of the spring clip, each knuckle having a corresponding slotted pin hole (i.e., elongated hole) to receive a hinge pin for rotatably coupling a flapper door assembly thereto and in alignment with the valve inlet/outlet fluid pathway. The spring clip is configured to be received within a corresponding retaining slot/groove formed proximate to an abutment surface of the valve body (i.e., the surface upon which the sealing gasket of the flapper door assembly is seated when the door is in a closed position). In particular, the clip may be compressed and then seated within the retaining slot/groove machined into the valve body. The use of this spring clip design provides notable advantages. For example, the spring clip may generally be formed from sheet metal and can be punched and formed using a mold, thereby resulting in a very simple, reliable, and cost-effective method of manufacture. Furthermore, such a design makes it easier to provide the elongated pin holes, which can be formed via punching manufacturing techniques.

In another embodiment, a check valve of the present invention improves upon the construction of the flapper door assembly itself. In particular, the flapper door assembly of the present invention includes a sealing gasket with an integrated stem machined as a single piece and subsequently used for bucking the sealing gasket to the hinge member of the flapper door assembly. More specifically, the sealing gasket includes a metal core portion, that includes an integrated stem formed as part of the metal portion, and a gasket portion formed around the metal core portion (i.e., rubber or other deformable material for providing a seal). Accordingly, the sealing gasket is a single component, consisting of a gasket seal portion formed over a metal core which includes an integrated stem (in the form of a rivet pin) that can then be bucked to the hinge member to thereby connect the sealing gasket to the hinge. By providing a single sealing gasket component, in which the solid body rivet pin is already integrated into the metal core portion of the sealing gasket, it is much easier to buck the stem to the hinge and further provides an airtight seal and prevents any leaks that would otherwise occur in the traditional manner of coupling a sealing gasket to a hinge (which requires a separate solid-body rivet). Furthermore, the improved design of the present invention allows far looser manufacturing tolerances, as the rivet stem does not need to be bucked perfectly every time.

It should further be noted that, in some embodiments, a check valve of the present invention includes both the spring clip and sealing gasket designs.

Figures 3, 4:
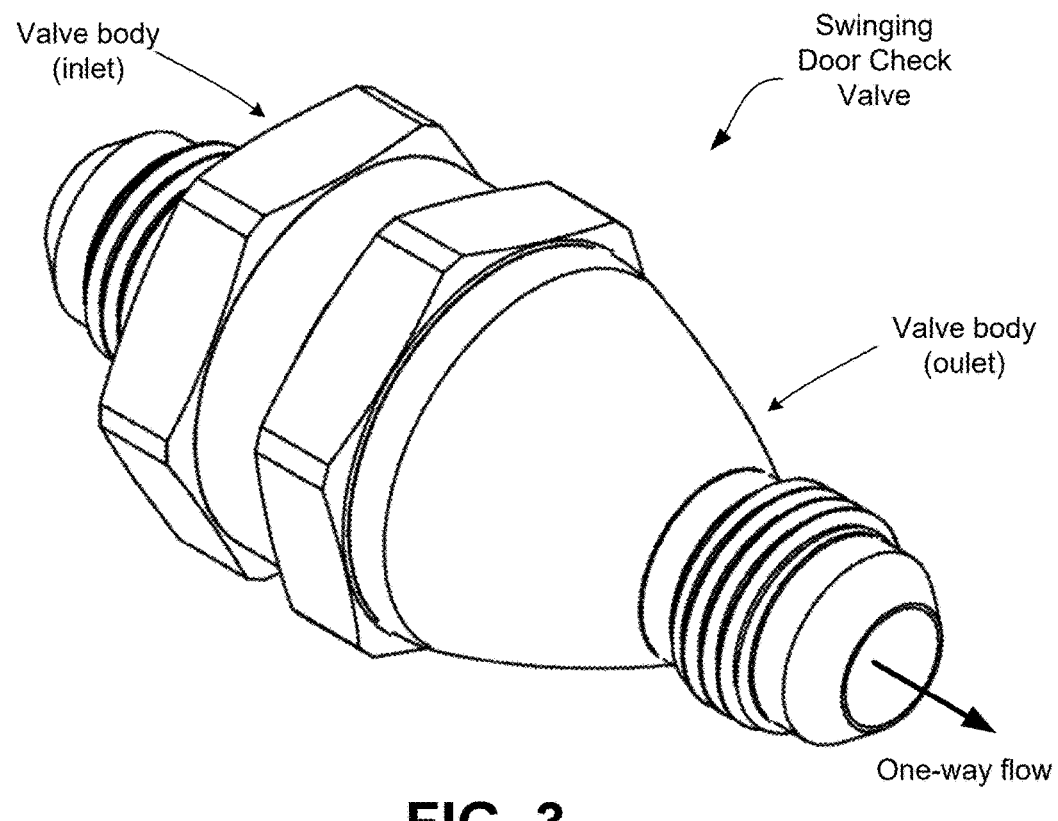
FIG. 3 is a perspective view of a swinging door check valve consistent with the present disclosure.
FIG. 4 is a side view of the swinging door check valve.
Figures 5A, 5B:
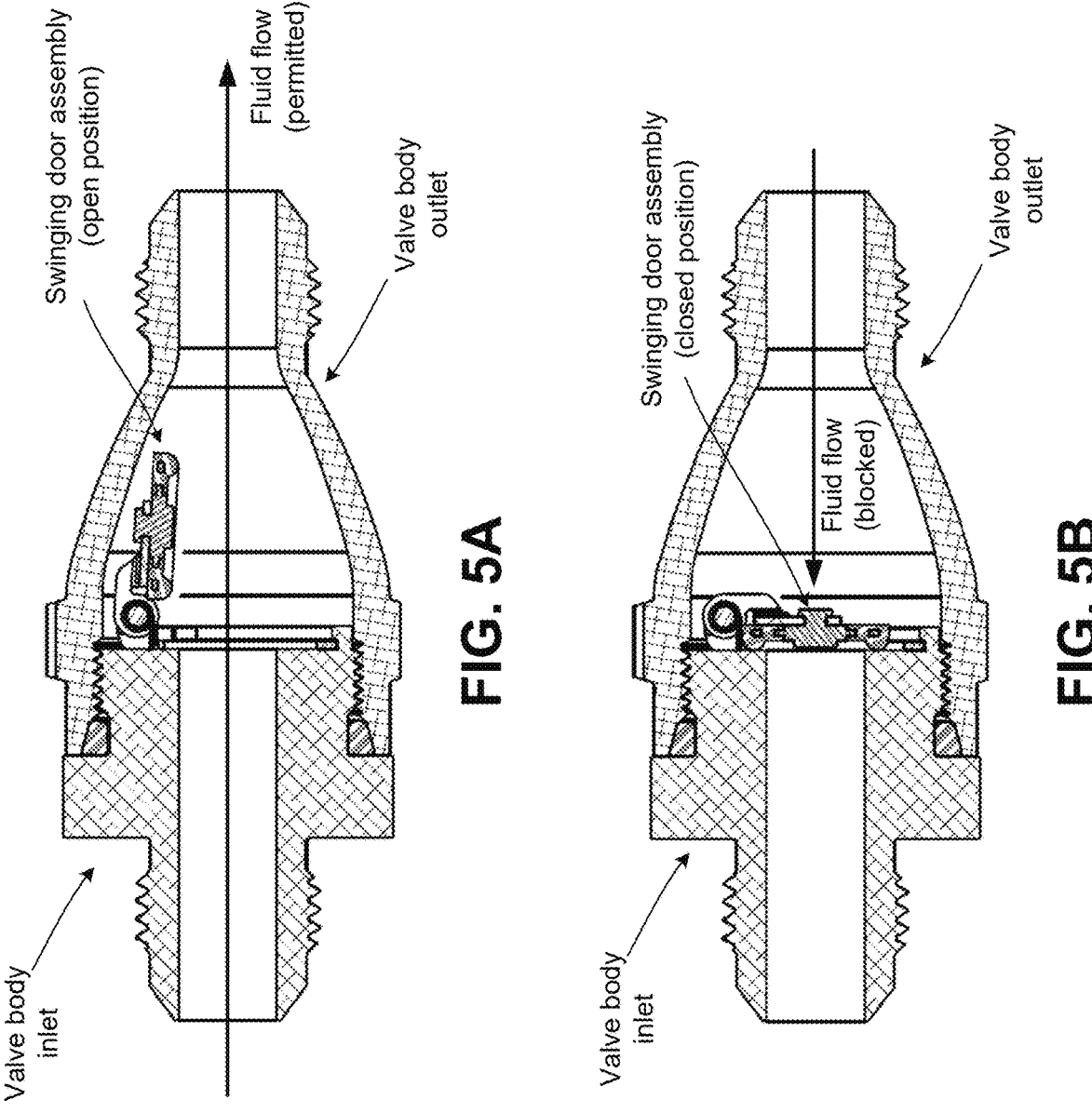
FIG. 5A is a cross-sectional view of the swinging door check valve taken along line A-A of FIG. 4, illustrating the swinging flapper door assembly in an open position.
FIG. 5B is a cross-sectional view of the swinging door check valve taken along line B-B of FIG. 4, illustrating the swinging flapper door assembly in a closed position.

FIG. 3 is a perspective view of a swinging door check valve consistent with the present disclosure. FIG. 4 is a side view of the swinging door check valve. FIG. 5A is a cross-sectional view of the swinging door check valve taken along line A-A of FIG. 4, illustrating the swinging flapper door assembly in an open position. FIG. 5B is a cross-sectional view of the swinging door check valve taken along line B-B of FIG. 4, illustrating the swinging flapper door assembly in a closed position.

As shown, the check valve of the present invention may generally include a two-part valve body, including an inlet portion and an outlet portion. Each portion generally includes at least an upstream end and a downstream end and a bore extending therethrough interconnecting the upstream and downstream ends to form a fluid pathway. Accordingly, once coupled together (via a threaded engagement or the like), the bores of each of the inlet and outlet portions of the valve body substantially align with one another.

With reference specifically to the inlet portion of the valve body, it is noted that such a portion of the valve body includes an upstream end (in which fluid flows into) and a downstream end (in which fluid flows out of) and a bore extending therethrough interconnecting the upstream and downstream ends to form a fluid pathway (that flows from the upstream end towards the downstream end). The valve body (of the inlet portion of the two-part valve body) further comprises an annular shoulder including an abutment surface adjacent to the downstream end of the valve body. As further illustrated, a swinging flapper door assembly is provided at the downstream end and is configured to rotate between at least a closed position (see FIG. 5B), in which a sealing gasket of the swinging flapper door assembly engages and mates with the abutment surface to prevent flow upstream through the bore, and an open position, in which the sealing gasket is disengaged from the abutment surface and fluid is able to flow downstream through the bore (see FIG. 5A).

Figure 6A:
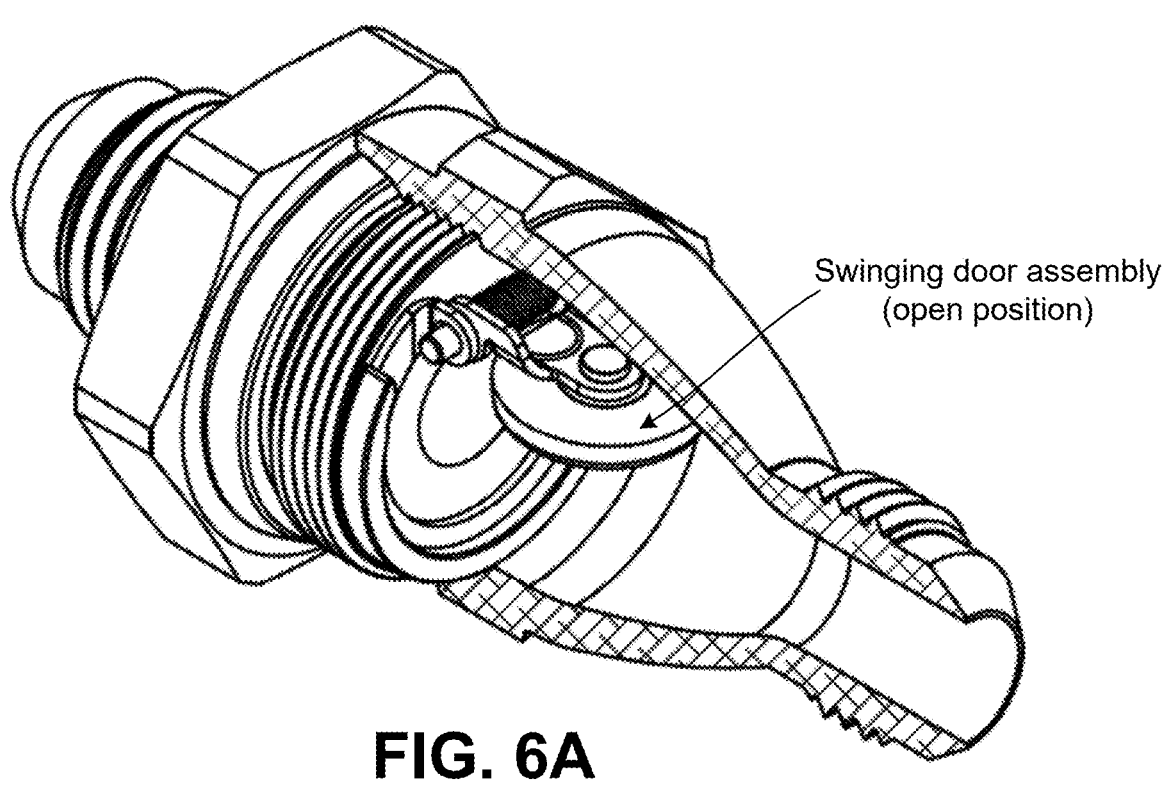
FIGS. 6A and 6B are perspective views, partly in section, of the swinging door check valve illustrating the swinging flapper door assembly in open and closed positions, respectively.
Figure 6B:
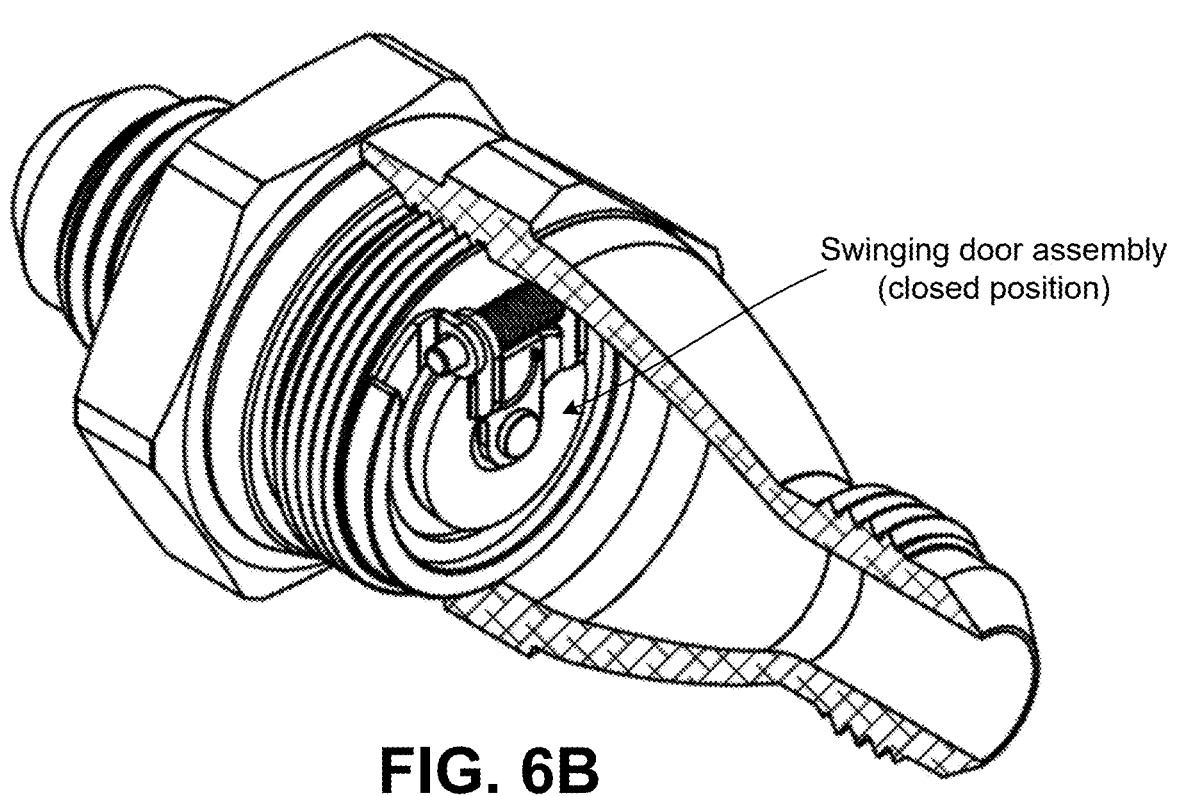

The illustrated check valve further includes a unique spring clip design configured to provide the hinged connection between the flapper door assembly and valve body, thereby replacing the traditional hinged connection (which relied on machined pin holes in a body of the valve). More specifically, an annular spring clip is positioned and retained within a retaining slot formed along a portion of the abutment surface adjacent the downstream end. FIGS. 6A and 6B are perspective views, partly in section, of the swinging door check valve illustrating the swinging flapper door assembly in open and closed positions, respectively, and pivoting via a hinged connection with the spring clip.

Figure 7:
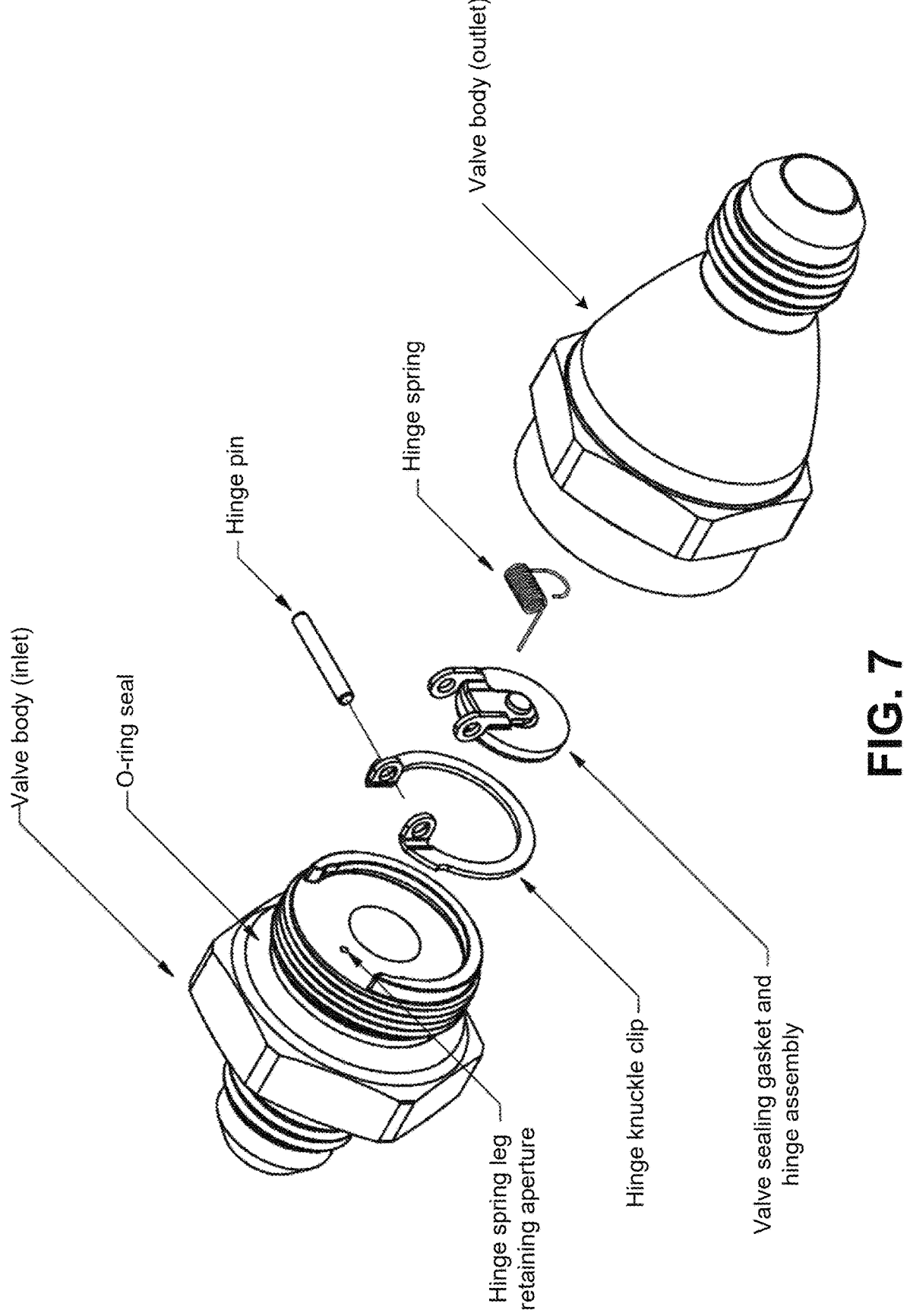
FIG. 7 is a perspective, exploded view of the swinging door check valve showing the various components.

FIG. 7 is a perspective, exploded view of the swinging door check valve showing the various components, including the spring clip (also referred to herein as "hinge knuckle clip"). As shown, the two-part valve body is separated into the inlet and outlet portions of the valve body.

Figure 8C:
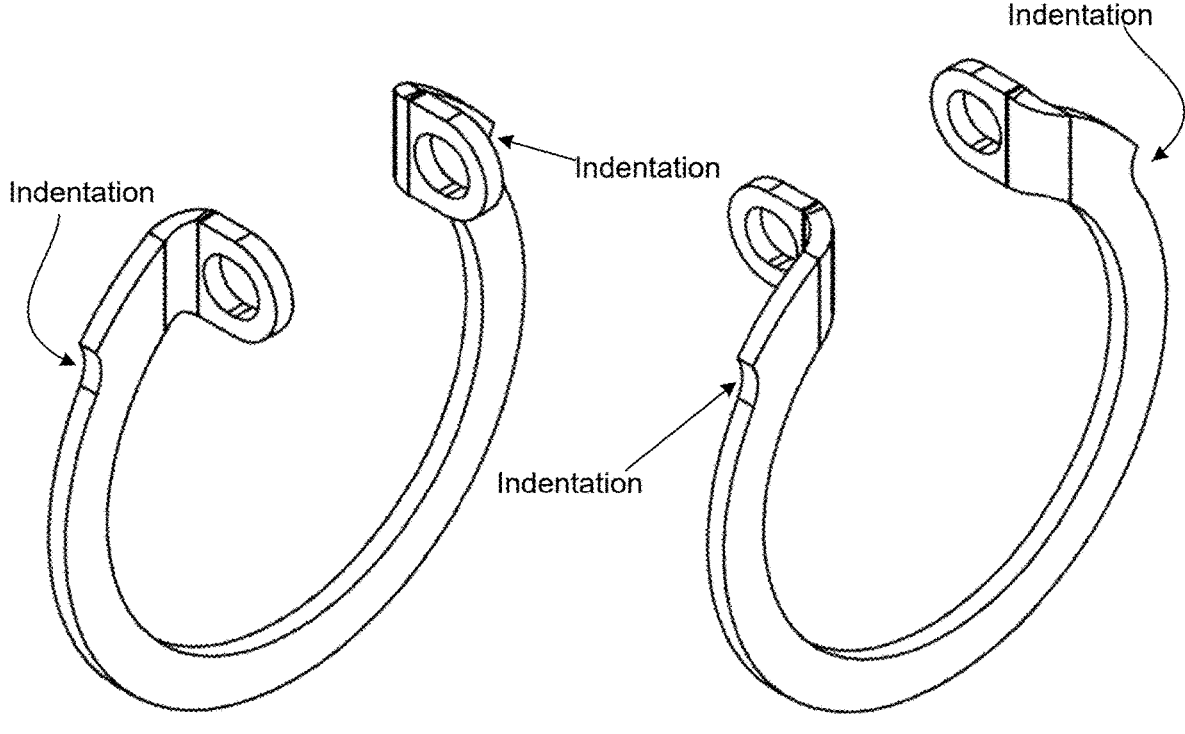
Figure 8C:
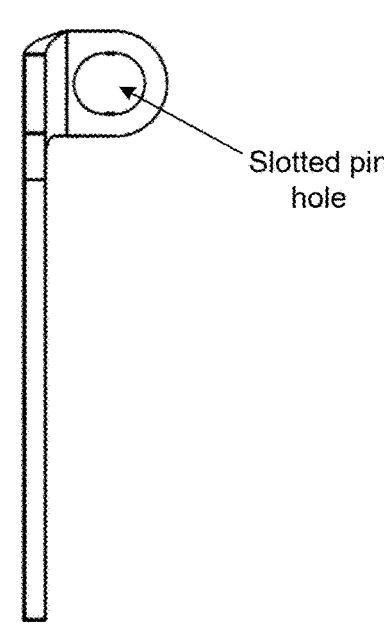

FIGS. 8A and 8B are perspective front and rear views and FIG. 8C is a side view of the unique spring clip for providing a hinged connection between the flapper door assembly and at least the valve body (forming the inlet).

As shown, the spring clip has an annular shape and comprises a pair of knuckles extending therefrom, each of which comprises pin hole and allow for a hinge pin to be received therein (for pivotally coupling to a hinge member of the swinging flapper door assembly). The pin hole of each of the pair of knuckles of the spring clip is elongated, generally having a slotted shape, which allows for the sealing gasket to provide a better seal against the abutment surface of the valve body when the swinging flapper door assembly is in the closed position, as previously discussed herein. The spring clip is generally of unitary construction. For example, the spring clip may be constructed from sheet metal, such as spring steel.

As shown, the pair of knuckles of the spring clip are provided at an open end of the spring clip. The spring clip comprises at least one locating feature for essentially maintaining at least a rotational position of the spring clip when mounted within the retaining slot of the valve body. For example, the at least one locating feature may generally include an indentation defined on the clip body that is shaped and/or sized to accommodate a respective portion of the retaining slot and prevent rotation of the spring clip within the retaining slot when positioned therein. As shown, the spring clip comprises a pair of locating features, wherein a first locating feature comprises a first indentation formed adjacent to a first knuckle of the spring clip and a second locating feature comprises a second indentation formed adjacent to a second knuckle of the spring clip. The first and second indentations are shaped and/or sized to accommodate a respective leading edge of the retaining slot and thereby prevent rotation of the spring clip within the retaining slot when positioned therein. In particular, the retaining slot may be semi-circular in shape and thereby include a first leading edge and an opposing second leading edge, each of which is configured to be received within one of the indentations of the spring clip and thereby prevent the spring clip from rotation. When positioned within the retaining slot, the spring clip exerts an outward force against the retaining slot, thereby maintaining the spring clip within the retaining slot and the leading edges accommodated within the respective indentations of the spring clip.

Figure 9:
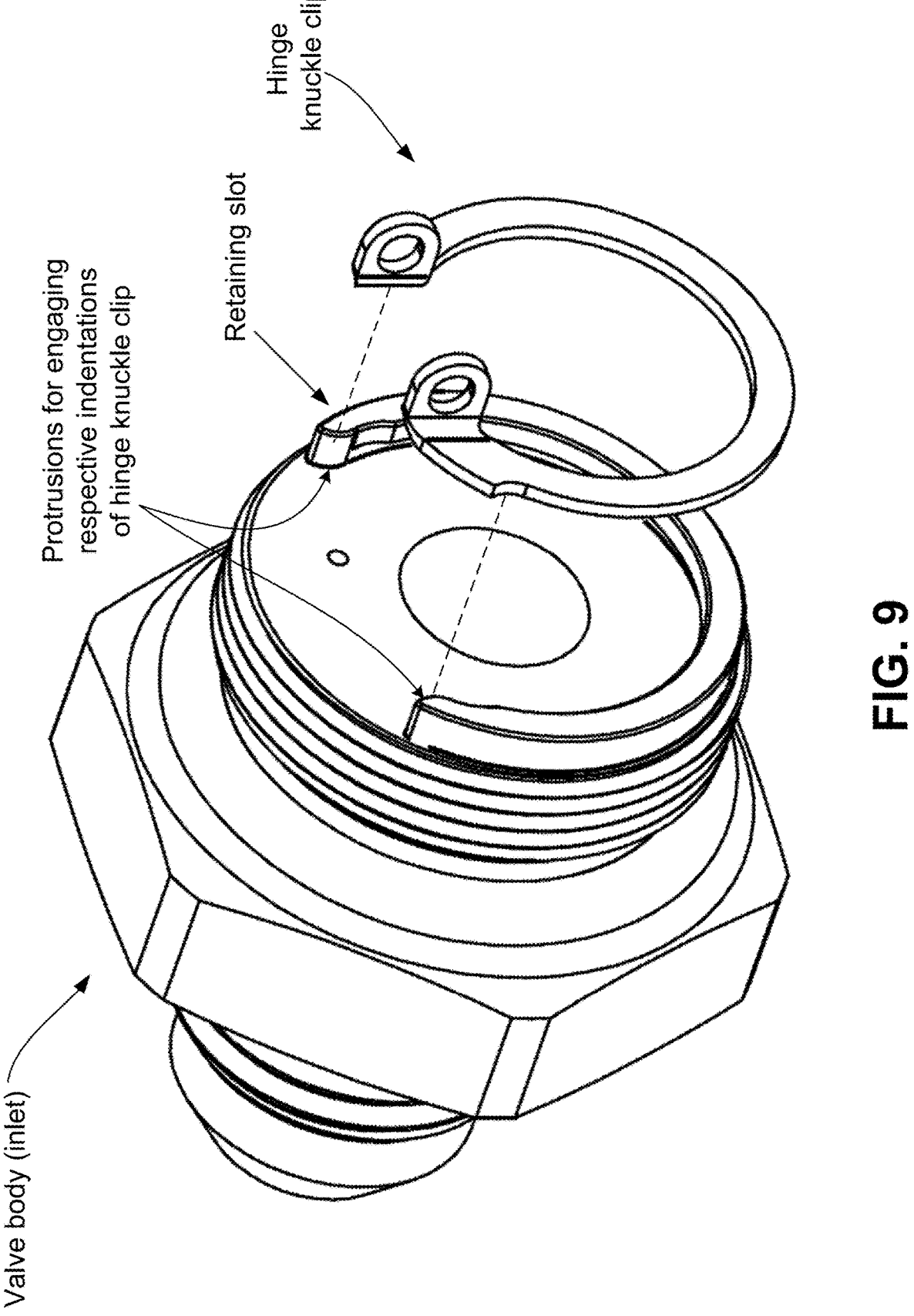
FIG. 9 is an enlarged perspective view of the valve body (forming the inlet) illustrating the retaining slot/groove formed proximate to an abutment surface of the valve body and configured for receiving and retaining the unique hinge knuckle clip.

FIG. 9 is an enlarged perspective view of the valve body (forming the inlet) illustrating the retaining slot/groove formed proximate to an abutment surface of the valve body and configured for receiving and retaining the unique hinge knuckle clip. As shown, the retaining slot is semi-circular and thereby comprises a first leading edge and an opposing second leading edge, each of which is configured to be received within one of the indentations of the spring clip and thereby prevent the spring clip from rotation. For example, when installing the spring clip, the knuckle ears are compressed together and the clip is positioned within the retaining slot. Upon releasing the compression when positioned within the retaining slot, the spring clip exerts an outward force against the retaining slot, thereby maintaining the spring clip within the retaining slot. The indentations essentially accommodating the corresponding leading edges of the retaining slot and thus prevent any rotation of the spring clip (due in part to the outward force exerted by the spring clip, as it is still in a somewhat compressed state). Furthermore, the hinge knuckle clip may be dimensioned such it is impossible to compress sufficiently to release the hinge knuckle clip from within the retaining groove once it has been installed between the knuckle ears. This improves the reliability of the valve, as the spring clip, hinge, knuckle, flapper and hinge pin assembly cannot be dismantled without removing the pin, which requires decoupling the two valve halves.

Figure 10:
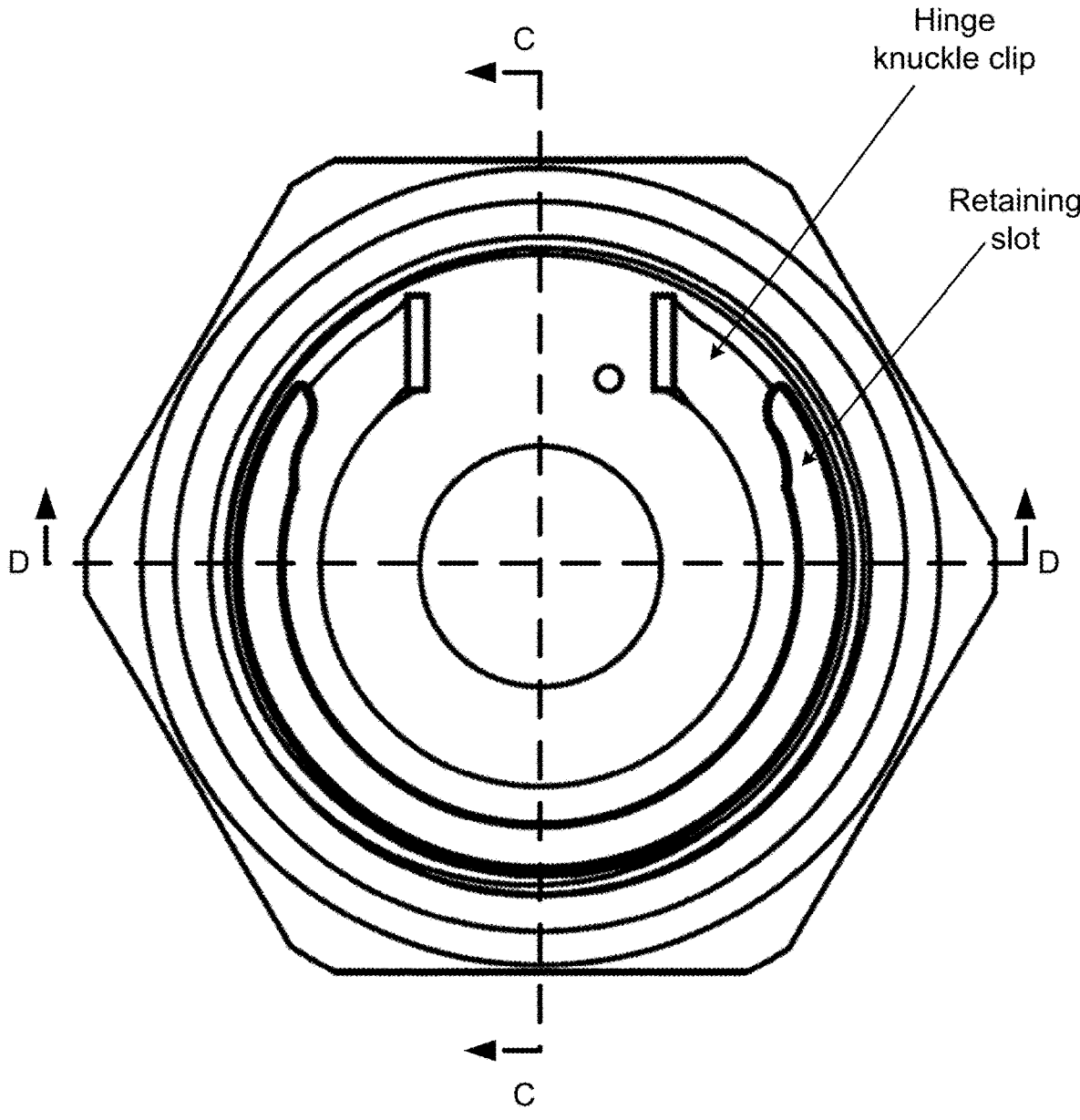
FIG. 10 is a front facing view of the inlet portion of the valve body (forming the inlet) illustrating the hinge knuckle clip received and retained within the retaining slot/groove of the valve body.
Figure 11A:
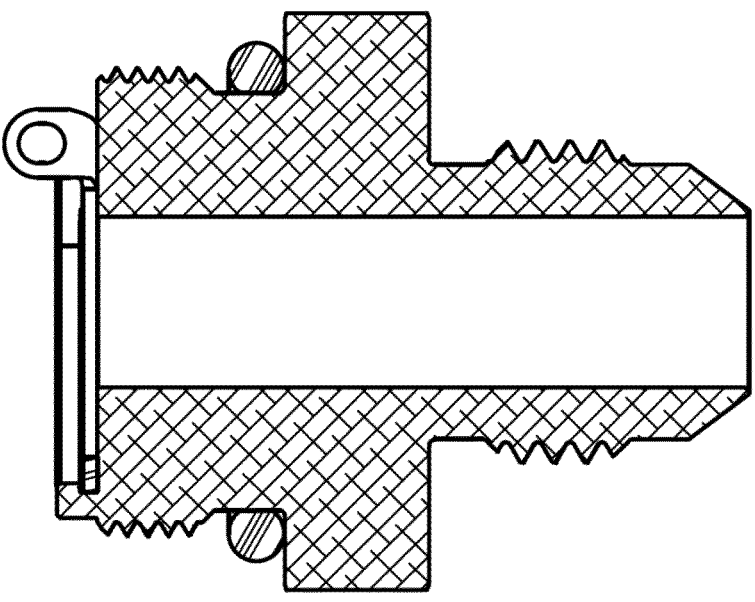
FIGS. 11A and 11B are cross-sectional views of the valve body (forming the inlet) including the hinge knuckle clip received and retained within the retaining slot/groove of the valve body taken along lines C-C and D-D, respectively.
Figure 11B:
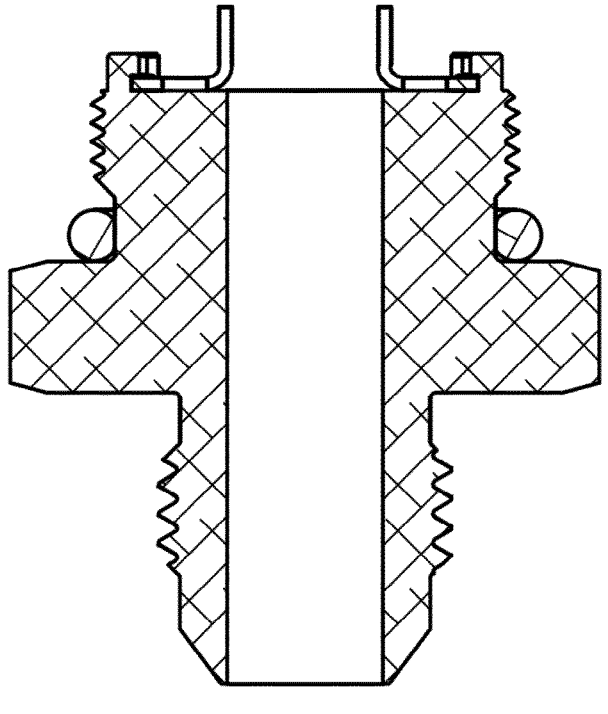

FIG. 10 is a front facing view of the inlet portion of the valve body (forming the inlet) illustrating the hinge knuckle clip received and retained within the retaining slot/groove of the valve body. FIGS. 11A and 11B are cross-sectional views of the valve body (forming the inlet) including the hinge knuckle clip received and retained within the retaining slot/groove of the valve body taken along lines C-C and D-D, respectively.

The swinging flapper door assembly comprises a hinge member including a pair of knuckles each comprising a pin hole. The hinge member of the swinging flapper door assembly is pivotally coupled to the spring clip by way of a hinge pin extending through the pair of knuckles of the spring clip and pair of knuckles of the hinge member. A spring member is operably coupled to at least the swinging flapper door assembly and configured to maintain the swinging flapper door assembly in a closed position until a downstream flow of fluid has sufficient force to overcome the force imparted by the spring member. The spring member may include a torsion spring, or the like.

Figure 12A:
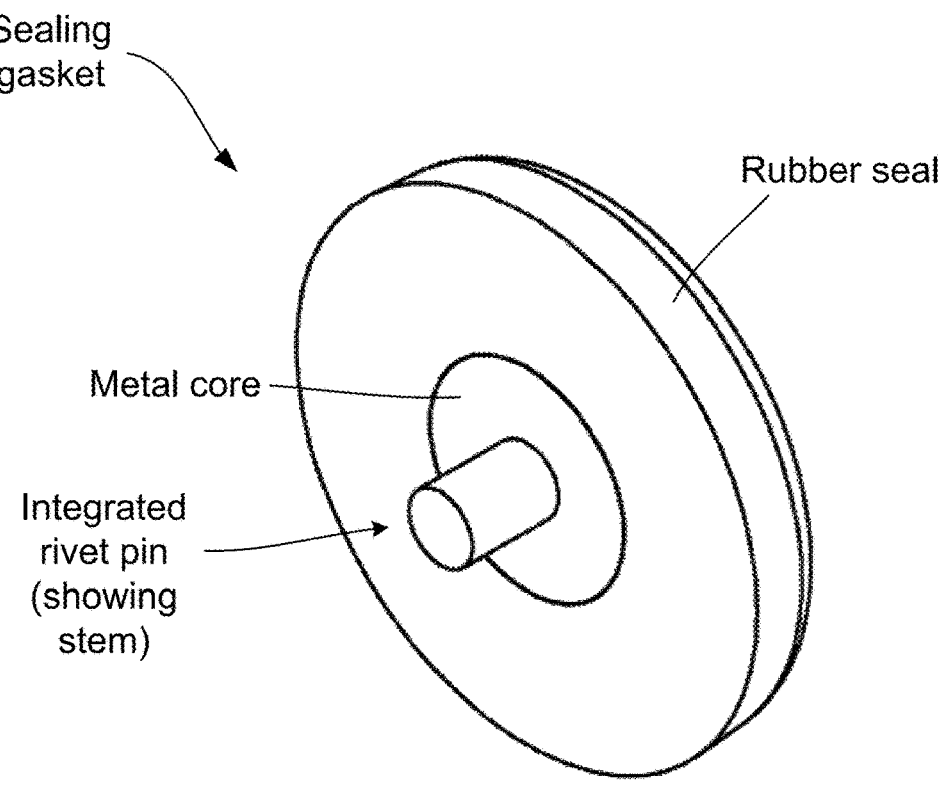
FIGS. 12A and 12B are perspective front and rear facing views, respectively, of the unique sealing gasket of the present invention, illustrating the sealing gasket is a single component, consisting of a gasket seal portion formed over a metal core which includes an integrated stem (in the form of a rivet pin).
Figure 12B:
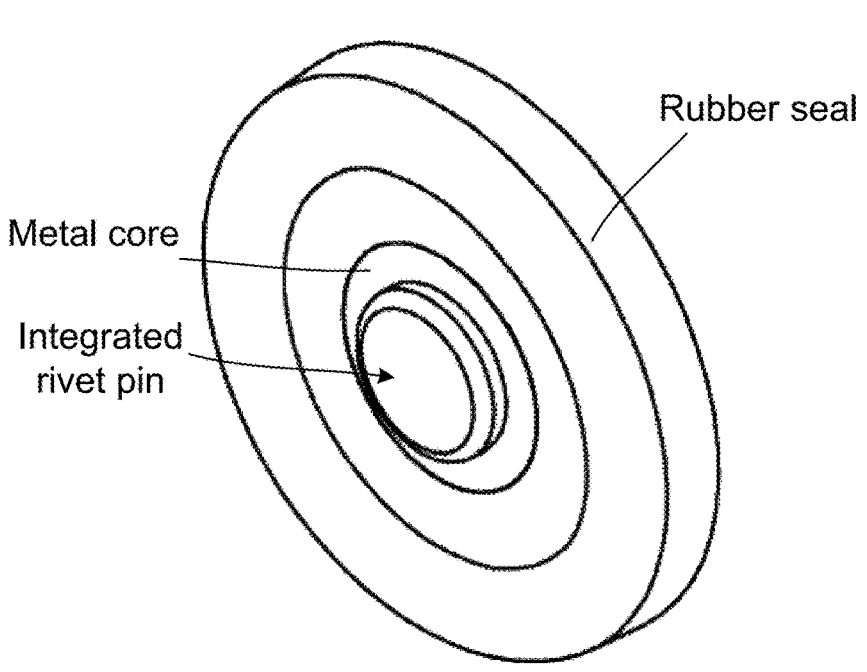

FIGS. 12A and 12B are perspective front and rear facing views, respectively, of the unique sealing gasket of the present invention, illustrating the sealing gasket is a single component, consisting of a gasket seal portion formed over a metal core which includes an integrated stem (in the form of a rivet pin).

As shown, the sealing gasket comprises a metal core portion and a gasket seal portion formed substantially over and around a perimeter of the metal core portion. The metal core portion further includes an integrated stem extending therefrom, which generally is in the form of a rivet pin and is used to fix the sealing gasket to a hinge member (as described in greater detail herein with reference to FIGS. 15-20).

Figure 13:
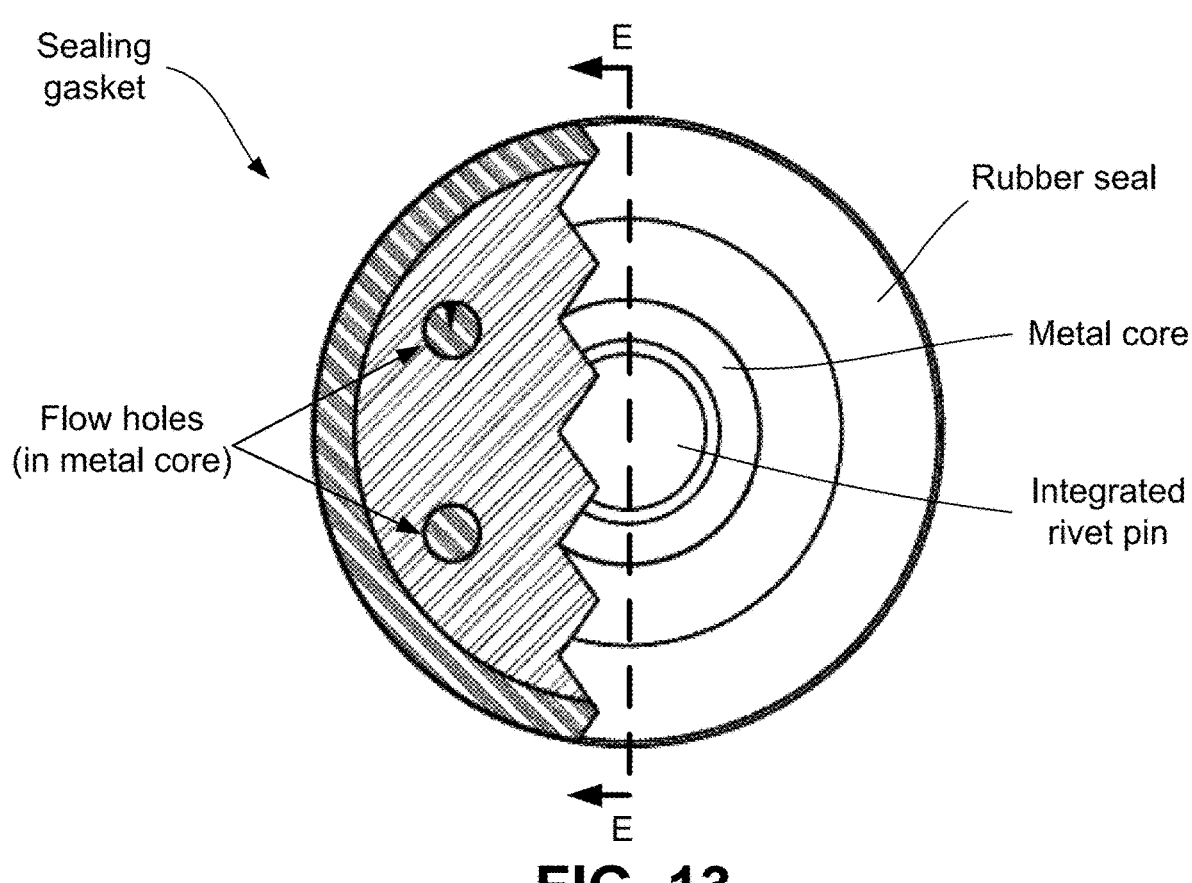
FIG. 13 is a plan view, partly in section, illustrating the unique sealing gasket of the present invention, including showing the gasket seal portion formed over a metal core which includes an integrated stem (in the form of a rivet pin).
Figure 14:
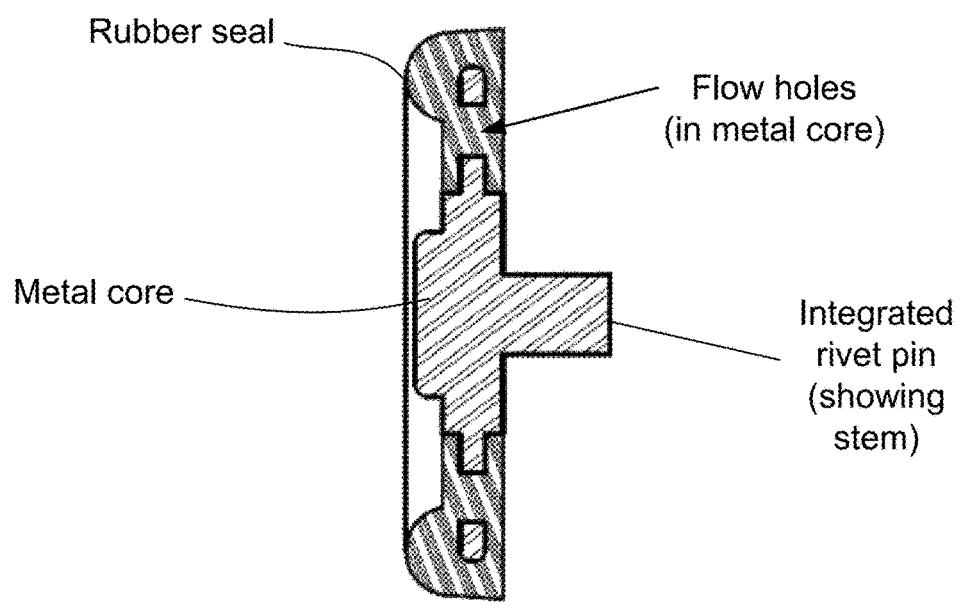
FIG. 14 is a cross-sectional view of the sealing gasket taken along line E-E of FIG. 13.

FIG. 13 is a plan view, partly in section, illustrating the unique sealing gasket of the present invention, including showing the gasket seal portion formed over a metal core which includes an integrated stem (in the form of a rivet pin). FIG. 14 is a cross-sectional view of the sealing gasket taken along line E-E of FIG. 13. As shown, the metal core portion of the sealing gasket comprises one or more flow holes. The flow holes allow for improved bonding of the gasket seal portion, such as a rubber gasket or the like, over the metal portion. For example, the gasket seal portion may include rubber which can be chemically bonded to the metal core portion, as the one or more flow holes allow for rubber material to flow through portions of the metal core portion to thereby allow for front and rear sides of the rubber gasket to bond together. Accordingly, the inclusion of the flow holes in the metal core portion improves reliability and aids in the prevention of delamination of the rubber gasket from the metal core.

Figure 15:
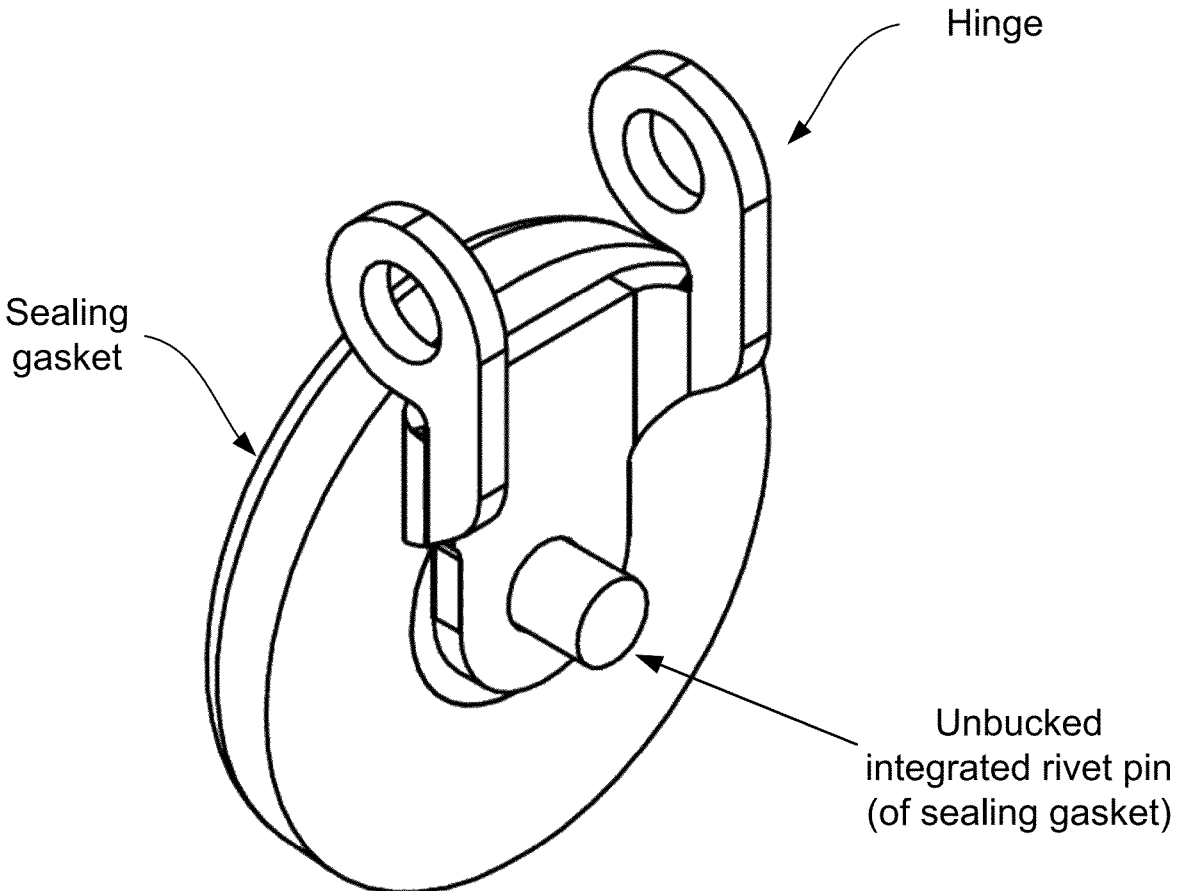
FIGS. 15-20 illustrate the coupling of the sealing gasket to the hinge.
Figure 16:
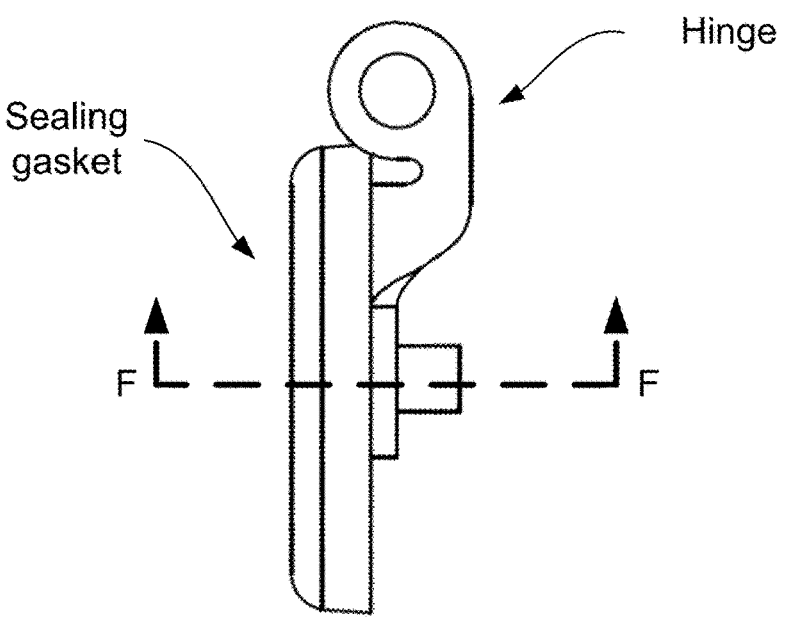
Figure 17:
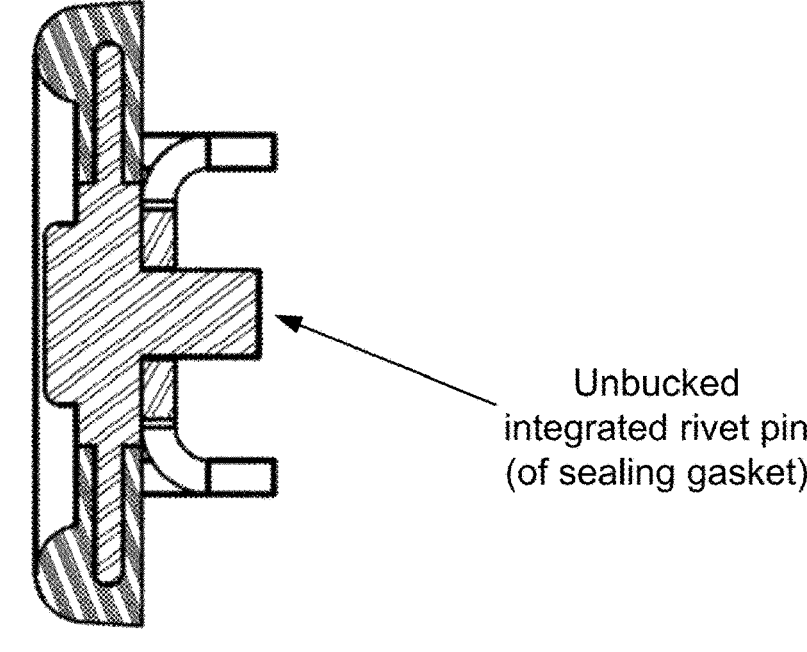
Figure 18:
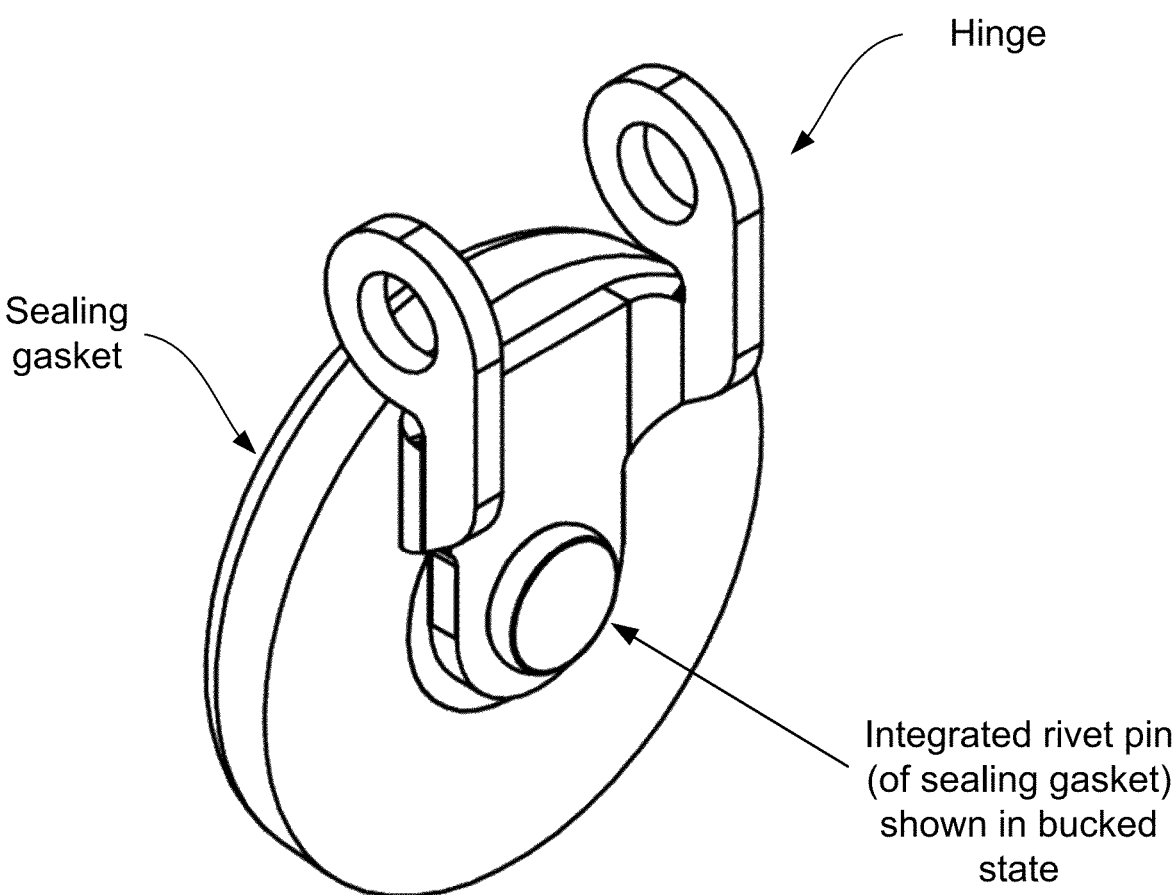
Figure 19:
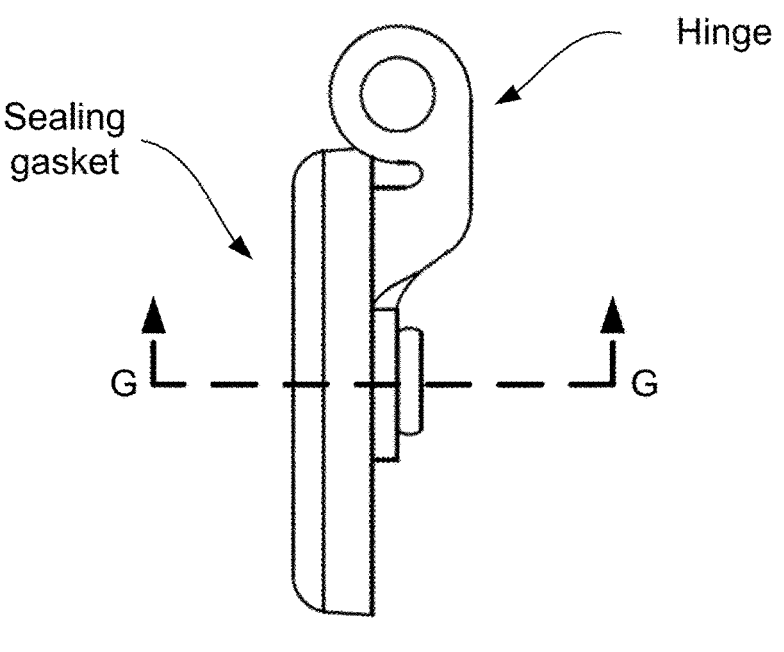
Figure 20:
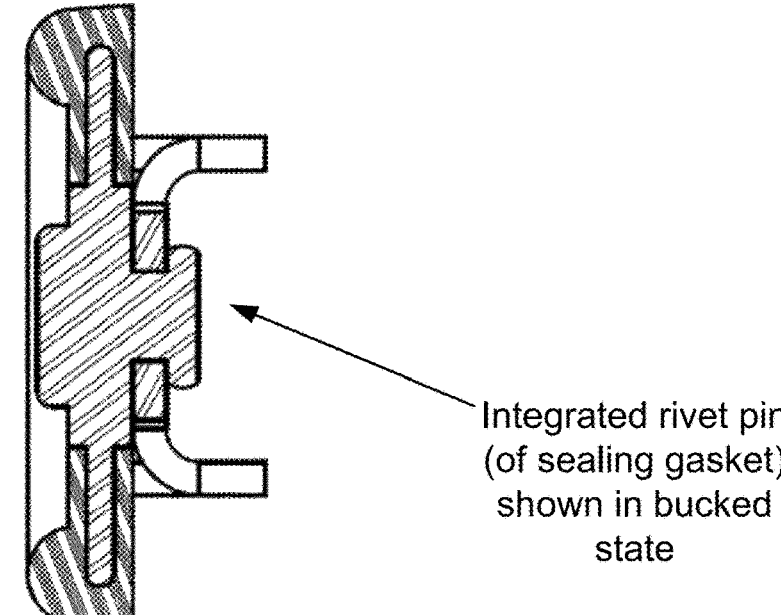

FIGS. 15-20 illustrate the coupling of the sealing gasket to the hinge member. FIGS. 15 and 16 are perspective and side views of the sealing gasket positioned relative to the hinge, including placement of the stem of the sealing gasket through a corresponding aperture in the hinge leaf. FIG. 17 is a cross-sectional view of the sealing gasket positioned relative to the hinge taken along line F-F of FIG. 16. FIGS. 18 and 19 are perspective and side views of the sealing gasket coupled to the hinge, illustrating the stem in a bucked state. FIG. 20 is a cross-sectional view of the sealing gasket coupled to the hinge taken along line G-G of FIG. 19.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. A check valve comprising:
a valve body comprising at least an upstream end and a downstream end and a bore extending therethrough interconnecting the upstream and downstream ends to form a fluid pathway, the valve body further comprising an annular shoulder including an abutment surface adjacent to the downstream end of the valve body and a retaining slot formed along a portion of the abutment surface;
an annular spring clip positioned and retained within the retaining slot, the spring clip comprising a pair of knuckles extending therefrom and each comprising pin hole; and
a swinging flapper door assembly pivotally coupled to the valve body via a hinged connection with the spring clip, the swinging flapper door assembly being configured to rotate between at least a closed position and an open position,
wherein, when the swinging flapper door is in the closed position, a sealing gasket of the swinging flapper door assembly engages and mates with the abutment surface to prevent flow upstream through the bore; and
wherein, when the swinging flapper door is in the open position, the sealing gasket is disengaged from the abutment surface and fluid is able to flow downstream through the bore.

2. The check valve of claim 1, wherein the pin hole of each of the pair of knuckles of the spring clip is elongated.

3. The check valve of claim 2, wherein the elongated pin holes generally have a slotted shape.

4. The check valve of claim 1, wherein the pair of knuckles of the spring clip are provided at an open end of the spring clip.

5. The check valve of claim 4, wherein the spring clip comprises at least one locating feature.

6. The check valve of claim 5, wherein the at least one locating feature comprises an indentation defined on the clip body.

7. The check valve of claim 6, wherein the indentation is shaped and/or sized to accommodate a respective portion of the retaining slot and prevent rotation of the spring clip within the retaining slot when positioned therein.

8. The check valve of claim 6, wherein the indentation is formed adjacent to a first knuckle of the spring clip.

9. The check valve of claim 8, wherein the indentation is shaped and/or sized to accommodate a leading edge of the retaining slot.

10. The check valve of claim 4, wherein the spring clip comprises a pair of locating features, wherein a first locating feature comprises a first indentation formed adjacent to a first knuckle of the spring clip and a second locating feature comprises a second indentation formed adjacent to a second knuckle of the spring clip.

11. The check valve of claim 10, wherein the first and second indentations are shaped and/or sized to accommodate a respective leading edge of the retaining slot and thereby prevent rotation of the spring clip within the retaining slot when positioned therein.

12. The check valve of claim 11, wherein the retaining slot is semi-circular and comprises a first leading edge and an opposing second leading edge, each of which is configured to be received within one of the indentations of the spring clip and thereby prevent the spring clip from rotation.

13. The check valve of claim 1, wherein, when positioned within the retaining slot, the spring clip exerts an outward force against the retaining slot, thereby maintaining the spring clip within the retaining slot.

14. The check valve of claim 1, wherein the spring clip is of unitary construction.

15. The check valve of claim 14, wherein the spring clip is constructed from sheet metal.

16. The check valve of claim 14, wherein the spring clip comprises spring steel.

17. The check valve of claim 1, wherein the swinging flapper door assembly comprises a hinge member including a pair of knuckles each comprising a pin hole.

18. The check valve of claim 17, wherein the hinge member of the swinging flapper door assembly is pivotally coupled to the spring clip by way of a hinge pin extending through the pair of knuckles of the spring clip and pair of knuckles of the hinge member.

19. The check valve of claim 1, further comprising a spring member operably coupled to at least the swinging flapper door assembly and configured to maintain the swinging flapper door assembly in a closed position until a downstream flow of fluid has sufficient force to overcome the force imparted by the spring member.

20. The check valve of claim 19, wherein the spring member comprises a torsion spring.

21. A check valve comprising:

a valve body comprising at least an upstream end and a downstream end and a bore extending therethrough interconnecting the upstream and downstream ends to form a fluid pathway, the valve body further comprising an annular shoulder including an abutment surface adjacent to the downstream end of the valve body and a retaining slot formed along a portion of the abutment surface;

an annular spring clip positioned and retained within the retaining slot, the spring clip comprising a pair of knuckles extending therefrom and each comprising pin hole; and a swinging flapper door assembly pivotally coupled to the valve body via a hinged connection with the spring clip, the swinging flapper door assembly being configured to rotate between at least a closed position and an open position relative to the bore, wherein the swinging flapper door assembly comprises:

a hinge member comprising a pair of knuckles each comprising a pin hole for receiving a hinge pin to pivotally couple the assembly relative to the abutment surface of the valve body and a leaf portion; and a sealing gasket comprising a metal core portion and a gasket seal portion formed substantially over and around a perimeter of the metal core portion, wherein the sealing gasket is directly coupled to the leaf portion of the hinge member via a bucked integrated stem extending from the metal core portion of the sealing gasket and through an aperture of the hinge leaf;

wherein, when in the closed position, the sealing gasket of the swinging flapper door assembly engages and mates with the abutment surface to prevent flow upstream through the bore, and, when in the open position, the sealing gasket is disengaged from the abutment surface and fluid is able to flow downstream through the bore.

* * * * *